United States Patent [19]

King, Jr. et al.

[11] Patent Number: 5,319,542

[45] Date of Patent: Jun. 7, 1994

[54] SYSTEM FOR ORDERING ITEMS USING AN ELECTRONIC CATALOGUE

[75] Inventors: John E. King, Jr., Warrenton; John R. Nilsen, Reston, both of Va.

[73] Assignee: International Business Machines Corporation, Armonk, N.Y.

[21] Appl. No.: 589,353

[22] Filed: Sep. 27, 1990

[51] Int. Cl.$^5$ ............................................. G06F 15/22
[52] U.S. Cl. .................................... 364/401; 364/408
[58] Field of Search ...................... 364/401, 408, 406; 235/383; 379/90

[56] References Cited

U.S. PATENT DOCUMENTS

| | | | |
|---|---|---|---|
| 3,899,775 | 8/1975 | Larsen | 340/172 |
| 4,799,156 | 1/1989 | Shavit et al. | 364/401 |
| 4,984,155 | 1/1991 | Geire et al. | 364/401 |
| 4,992,940 | 2/1991 | Dworkin | 364/401 |

Primary Examiner—Roy N. Envall, Jr.
Assistant Examiner—Khai Tran

Attorney, Agent, or Firm—Jesse L. Abzug; Lauren C. Bruzzone

[57] ABSTRACT

The disclosed system facilitates the user in electronically ordering items from suppliers. The system is comprised of an Electronic Catlogue and an Electronic Requisition facility. The Electronic Catalogue includes a Public Catalog and a Private Catalogue. The Public Catalog is stored on a publicly available database for access by customer/Requestors. The Private Catalogue is resident on a Customer's computer system and may contain unique pricing data based on pricing agreements. The Electronic Requisition facility is used by the Customer/Requestors to electronically create purchase requisitions based upon the information provided in the catalogues and route the requisitions through the appropriate approval process within he enterprise. Requisitions are then processed through the customer's procurement system and transmitted electronically as purchase orders to Suppliers.

14 Claims, 4 Drawing Sheets

SYSTEM FOR ORDERING ITEMS USING AN ELECTRONIC CATALOGUE

BACKGROUND INFORMATION

1. Field of the Invention

This invention relates to a method and system for facilitating the ordering of items from suppliers. In particular, an electronic catalog requisition system and method is disclosed.

2. Background Art

Traditionally, procurement systems have been manual, labor intensive and costly operations. For example, a supplier would do mass mailings of catalogs to potential customers; the customers would browse the catalogs and select items to be purchased; and then the customer would complete a paper order form, or call the supplier to order the items. The entire process, from preparing the catalog to receipt of orders, often took several weeks, and possibly months. If a supplier wanted to continually update his catalogs, or provide different price schedules to different customers, the printing, distribution and administrative burden would be even more tremendous.

On a relatively small scale, some suppliers have offered catalogs through computer services, such as PRODIGY (a registered trademark of Prodigy Services Corp.). With PRODIGY, a computer user can dial-up a service from home and select items to purchase from various catalogs maintained on the system. Upon selection, PRODIGY initiates the order with the supplier.

While this has improved upon some of the disadvantages in typical procurement situations, there are still problems remaining that have yet to be solved. One such drawback is that PRODIGY does not provide the purchaser a competitive shopping tool. Comparative information on products offered by various suppliers is not simultaneously displayed, which would facilitate item selection.

Another drawback is that PRODIGY is not integrated with the industrial customer's procurement system, though its use is not limited to home customers. Still another drawback is that PRODIGY does not permit customers to maintain "Private Catalogs" on their own computer systems. Private Catalogs permit individual customers to control or limit the products or services, as desired by the customer. Private Catalogs also allow separate pricing structures for different customers based upon negotiated agreements with suppliers, as well as permit large corporations to maintain listings (catalogs) of surplus items available to its employees.

OBJECTS OF THE INVENTION

Therefore, it is an object of this invention to provide a new electronic procurement/requisition system and method which allow a purchaser's requisition system to be integrated with a catalog system, and a supplier computer system.

It is another object of this invention to provide an electronic requisition system which includes public and private catalogs.

It is another object of this invention to provide an electronic requisition system which allows individual customers to control the products and suppliers that may be ordered.

It is still another object of this invention to provide an electronic catalog ordering system that allows the simultaneous display of competitive product information.

It is still another object of this invention to provide private catalogs that are supplier maintained through access to the public catalog, thus significantly reducing customer maintenance of their private catalogs.

It is another object of this invention to provide an electronic catalog ordering system which includes direct catalog maintenance by suppliers.

SUMMARY OF THE INVENTION

These objects, and many more features and advantages as will be shown further, are accomplished by the electronic catalog ordering process and system herein described. The system comprises two major components: 1) the Electronic Catalogs, and 2) the Electronic Requisition.

The first Electronic Catalog segment consists of a Supplier Master Catalog which is maintained by each Supplier. It is used as the basis for the second Electronic Catalog segment, consisting of the Public Catalog and the Private Catalog.

The Public Catalog permits multiple customers to access and identify products from a variety of Suppliers. The Public Catalog contains the following functional features: Catalog Query/Display for logically guiding the requestors through the available catalog data; a Customer preferred path controller which directs the user to preferred Supplier catalogs thereby permitting customers to select products at prenegotiated discounts; a catalog finder which provides efficient search routines to locate Supplier catalogs card items within; a price discounter which automatically translates retail prices to specific customer contracted discount prices; customer shopping lists; Supplier authorization control; and the ability to permit Customers' procurement personnel to locate available supplier products and services required to satisfy requestor needs, as well as, provide supplier catalog data for initial load and maintenance of the Customers' private catalogs.

The Private Catalog functions allow Customers to load, access and identify supplier products on their own local computer systems rather than the Public Catalog. Private Catalogs contain many of the same features as the Public Catalogs, except for the price discounter function which is not required since the data base of the Private Catalog is customer specific.

The Electronic Requisition automates all manual transactions currently experienced in generating and processing hardcopy requisitions, including the approval process. Customization via automatic routing tables allow each Customer site to control requisition routing.

The electronic ordering method allows Suppliers to create machine readable forms of their Feaster Catalogs and transmit them to a public database as Public Catalogs, and to Customers as Private Catalogs, either directly or via the public database. The Customer, in turn, would then search the Catalogs for items to be purchased, load pertinent ordering information into an electronic requisition, and send electronic Purchase Orders for the items to the Suppliers.

BRIEF DESCRIPTION OF THE DRAWING

The foregoing and other advantages of the invention will be more fully understood with reference to the description of the preferred embodiment and with reference to the drawing wherein.

DESCRIPTION OF THE PREFERRED EMBODIMENT

General Concept

The electronic catalog ordering process and system provide an automated facility for procuring standard commercial parts and services. The two major components are: (1) the Electronic Catalog which permits on-line access to Suppliers' catalogs of products and services; and (2) the Electronic Requisition which automates the hardcopy requisition and its approval process. The interactive, electronic coupling of these 2 major components enable a Requestor to complete a purchase request during one system session. These two major components are distributed among the three principal players in the system, as described in further detail below.

Figure 1:
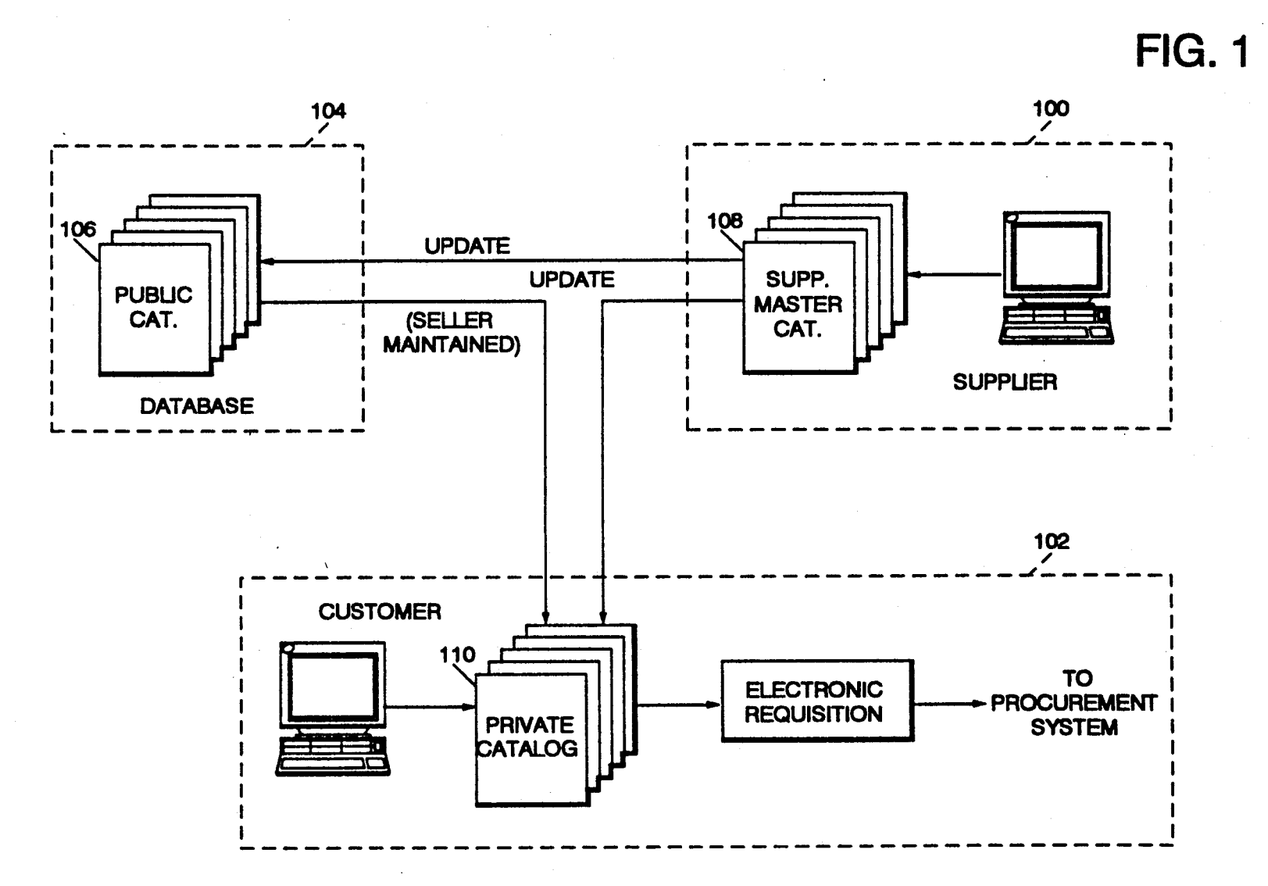
FIG. 1 is a block diagram showing the electronic catalog relationships.

Referring to FIG. 1, the electronic catalog ordering system involves three principal players, the Suppliers, designated by block 100; the Customers/Requestors, designated by block 102, and the Public Database, designated by block 104. The Suppliers 100 load and maintain the catalog data of the products and/or services that they offer to the Customers 102. The Customers/Requestors 102 are those who purchase products and/or services from the catalogs. The owners of the Public Database 104 develop, maintain and provide a host operating environment where the Public Catalog 106 resides.

The Electronic Catalog, in its full function configuration, consists of three functionally distinct catalogs. The Supplier 10 Master Catalog 108 is the catalog which contains the master information for all of the Suppliers' products and services. It is loaded and maintained by Suppliers 100 on their own local computer systems. From the Supplier Master Catalog 108, each Supplier 100 creates a Public Catalog 106 and sends it to the Public Database 104. The Public Catalogs 106 from many Suppliers 100 are loaded and maintained on a Public Database for access by Customers 102.

Suppliers also may create Private Catalogs 110 from the Supplier Master Catalogs 108 and from the Public Catalog 106. The Private Catalogs 110 are then loaded and maintained by Customers 110 on their own local computer systems for access by Customer employees. Private Catalogs 110 may also he maintained by Suppliers 100.

Electronic Catalog

Figure 2:
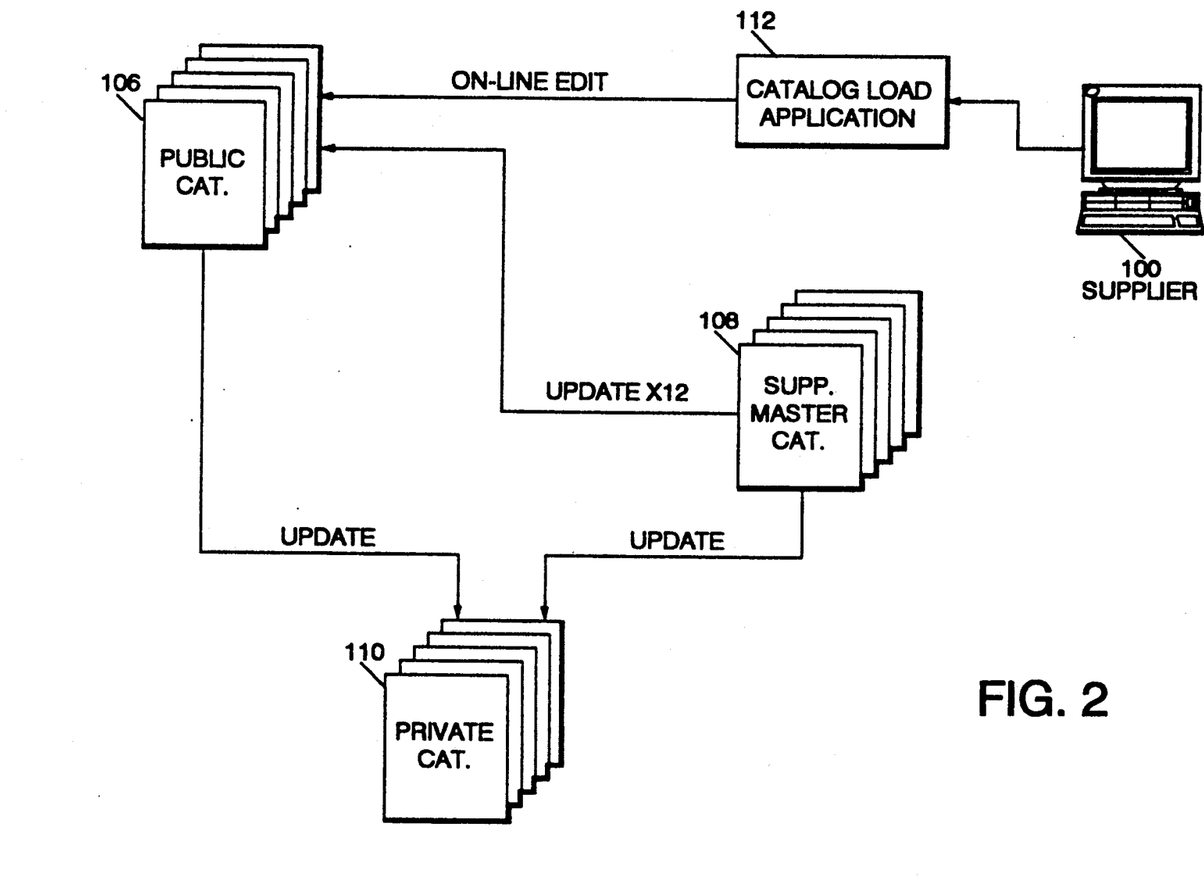
FIG. 2 is a detailed diagram of the Catalog Loader function.

Referring to FIG. 2, the Electronic Catalog consists of the Supplier Master Catalog 108, the Public Catalog 106 and the Private Catalog 110. The Supplier Master Catalog 108 is defined as a special catalog separately owned and maintained by Supplier for the purposes of building, storing and maintaining his catalog data prior to transmittal as a Public Catalog 106 or Private Catalog 110. The loading of the Public Catalog 106 is accomplished by loading the entire catalog, selected catalog commodity groups, or individual catalog items.

The Public Catalog 106 is defined as cross-industry catalogs resident on a third party network, for access by multiple customers. The loading and updating of the public cross-industry sector catalogs is accomplished by Suppliers whose catalog data is loaded using one of the following methods:

A) batch ANSI X12 (832) business transactions for initial loading or mass updates;
 B) real-time, on-line access for low volume or emergency updating;
 C) a tape dump, CD-ROM load, etc. of the Supplier Master Catalog 108.

The Private Catalog 110 is defined as a special catalog separately owned by the Customer and distinct from that of the Public Catalog 106. This catalog most likely would be resident on a Customer's local host computer system. Customers can store@catalog items in Private Catalogs where there are volume purchase agreements, corporate contract discounts, preferred suppliers, control items, special trading partners, etc. The goal of the Private Catalog 110 is to provide customers with competitive sourcing solutions. Private catalog loading is obtained by either;

A) periodic direct downloading from the Public Catalog 106;
 B) direct input from the Supplier database; or
 C) created by the Customer.

The Private Catalog 110 can reside on a Customer's host computer system, or on a public network, and can be maintained by Customers or Suppliers.

The loading and maintenance of the Supplier Master Catalog 108 is facilitated by a Catalog Loader Program (Cata-Loader) 112. The following is a list cf functional features of Cata-Loader Program 112:

A. Create New Catalog
 B. Catalog Set-up Profile
 C. Catalog Maintenance/Update
 D. Catalog Bulletin Maintenance
 E. Customer Access/Downlcad Control
 F. Customer Access Data Reports
 G. Catalog Review Session
 H. Public Catalog Load/Maintenance
 I. Private Catalog Load/Maintenance The Create New Catalog function permits a Supplier to create a catalog. The Catalog Set-up Profile function allows a Supplier to set-up a profile relating to his own business information which would eliminate the need to provide common information more than once. The type of data that falls into this category would include: supplier number, address, telephone number, contracts, business class, class of trade, fax number, DUNS number, etc. The Catalog Maintenance/Update function allows the addition of catalog items and includes the following fields: item name, commodity code, part numbers, description, prices, units of measure, package quantities, lead times, discounts, stock availability, etc. The Catalog Bulletin Maintenance feature allows a Supplier to provide general information to the Customer subscribing to its electronic catalogs. Announcements would include new product announcements, special promotions, price changes, recalls, etc. All bulletins generated by the Suppliers are classified into one of the above categories to permit Customers to have control over the types of bulletins propagated to their Requestors.

The Customer Access/Download Control function permits catalog Suppliers to control Customers' access to and downloading of Supplier maintained catalog data on the Public Catalog. This aids Suppliers in controlling where, and to whom, their product/pricing information is made available. Customer access control provides a mechanism for catalog Suppliers to control Customer access to their database. When invoked, this would inhibit/permit specific users access to the catalog information. Customer Download Control provides a mechanism for catalog Suppliers to authorize Customers to download catalog data to another host computer system. The Customer Access Data Reports function allows a Supplier to get reports on catalog usage and can be a very useful marketing aid. Comparisons of access time, market share, etc. are valuable features.

The initial loading or mass updates to the Public Catalog 106 are performed using EDI ANSI X12 832 business transactions. Features allow the Supplier to load catalog items, load catalog changes, load by specified commodity, load by specified item part number.

The Private Catalog 110 can be updated by the Suppliers. Data items that could be customized include unit prices, discount, payment terms, usage fees, etc. Suppliers can issue separate batch transaction commands modifying the above fields and sending the modifications via an EDI 832 transaction update directly to the Customer computer system.

Electronic Requisition Process

The Electronic Requisition is an automated form residing on a computer system which is used to initiate the procurement process. It is intended for use by four primary groups, each of which has specific responsibilities with regard to the ordering process and completion of the requisition as further described below with reference to FIG. 3. All user groups will need access to terminals or personal computer workstations to access the mainframe application.

Figure 3:
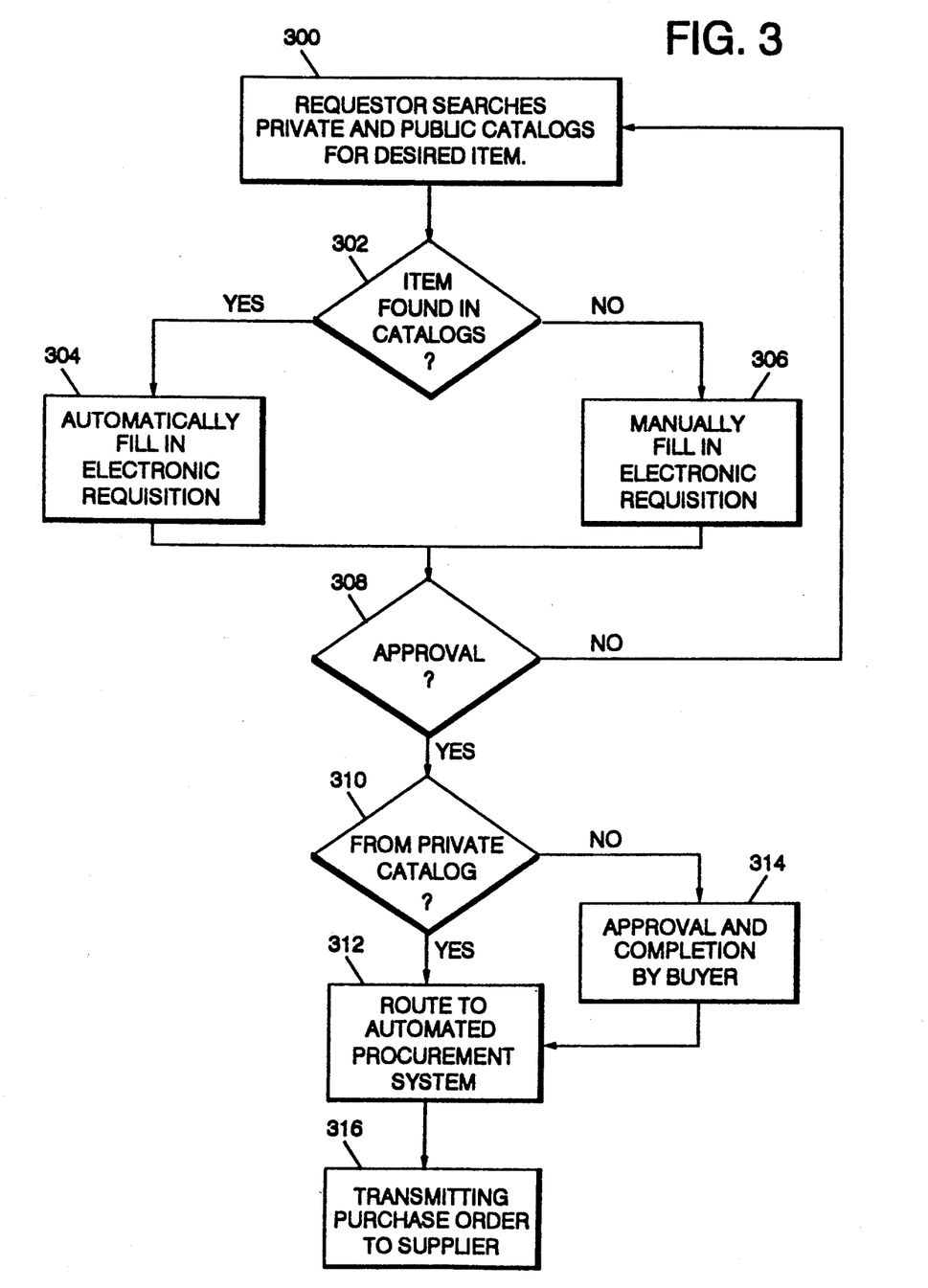
FIG. 3 is a block diagram showing the requisition process.

The Requester is the party who defines the need for a purchased item and has the responsibility for creating the purchase requisition. Through an application program, the Requester initiates the requisition by accessing the Public or Private Catalog to search for the item of interest (Block 300). If the item is found, the system will prefill the required fields of the requisition (Block 304). If the item is not in the Catalogs, the required data will have to be manually entered (Block 306). When utilizing the Private Catalog, the process becomes automatic since the source of the catalog item has been preapproved, and the order can be sent directly to the Supplier, without Buyer involvement, after approvals are obtained. Non-catalog purchases are routed and approved by the axle process, but the actual purchase transaction is completed by a buyer.

The validated requisition is then routed to the Approver (Block 308). The Approver will either reject it, which will bounce the requisition back to Block 300, or approve it. If approved the requisition will be routed to the company's procurement system (Block 312) for items ordered from the Private Catalog. For items not from the Private Catalog, the requisition goes to the Buyer for completion of the requisition and approval of the Supplier (Block 314).

The Buyer is the party in most companies who has been identified as the authorized agent to make purchases. The Buyer typically has responsibility for selecting where products may be purchased, as well as establishing an acceptable price that will be paid. In the electronic processing environment, the Buyer may receive an individual purchase requisition from a Requestor once it has been routed through the approval process. The Buyer may access the Public or the Private Catalog as deemed necessary to perform the normal buying task. When items are selected from the Catalog, the requisition is prefilled with required data and only minimal additional data will be needed. If a non-catalog item is to be purchased, the Buyer will keyboard in the required data to complete the transaction. Once the requisition has been approved (if required), it will then be processed through the company's procurement system and a Purchase Order will be electronically sent to the Supplier (Block 316).

The Approver is the party that has the authority to validate the need for purchase, that funding exists, etc. This individual will be identified by the company, and system tables will autocratically route requisitions as they are processed by the Requestor.

The Application Administrator is the party assigned over-all responsibility for the maintenance and control of the electronic requisition process. There may be more than one area responsible for different portions of the system. For example, a database administrator may control the routing/approval process in all associated tables. A Procurement Administrator may typically control those areas that relate to the requisition requirements.

System Architecture

Figure 4:
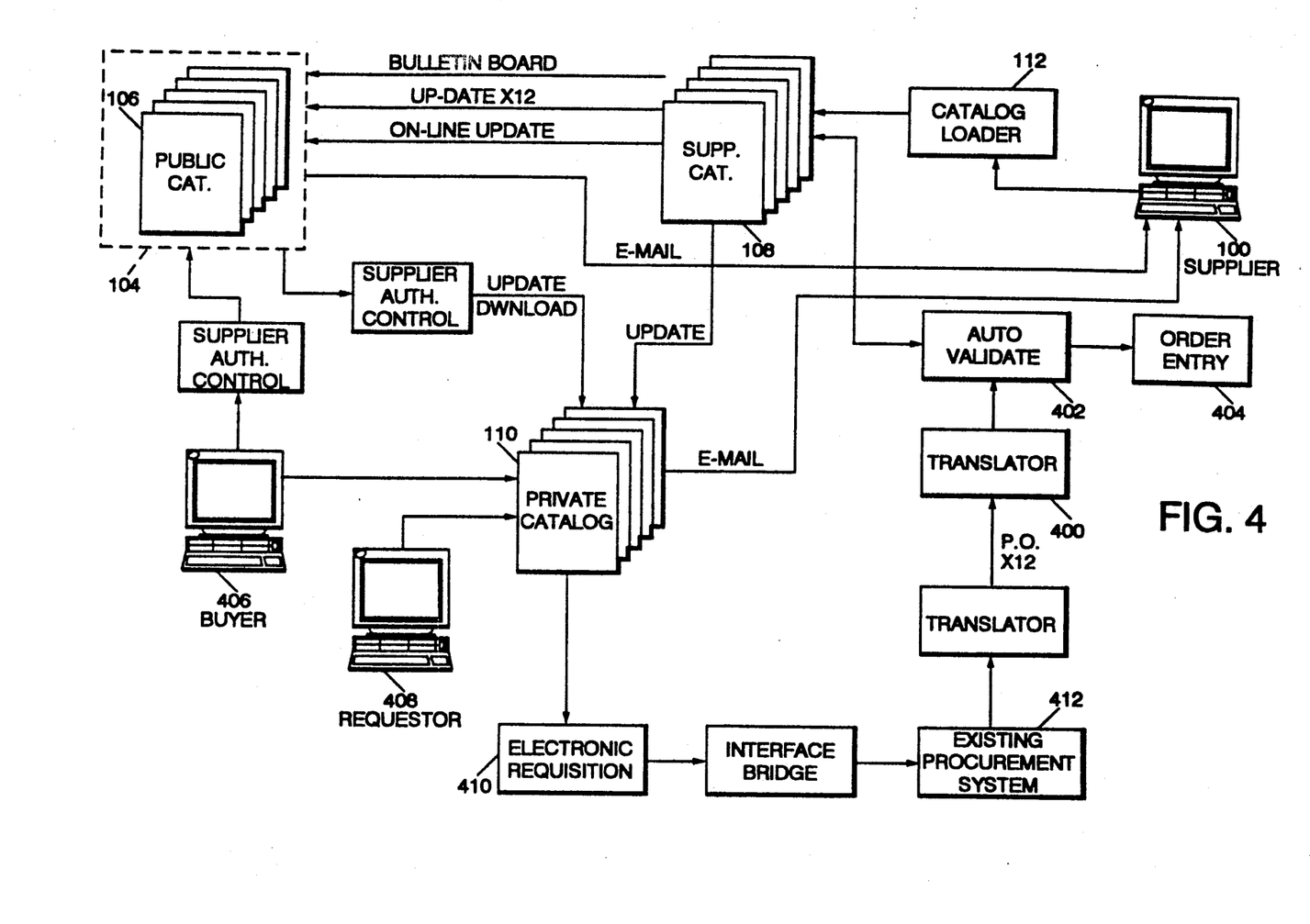
FIG. 4 is a detailed block diagram of the Electronic Catalog Ordering System.

The detailed system architecture is shown in FIG. 4. The Supplier's computer system is preferably an IBM 3090 (IBM is a registered trademark of International Business Machines Corporation) mainframe computer with attached personal computer workstations. With this arrangement, Supplier 100 can maintain catalogs using the Catalog Loader facility 112. Supplier 100 can also receive, translate (Block 400), validate (Block 402) and enter orders (Block 404) into its existing order entry system.

The Public Database 104 also uses an IBM 3090 mainframe running the MVS operating system. It includes facilities for controlling and distributing catalog data via communication lines connected to Suppliers and Customers.

The Customer operating environment includes a mainframe computer such as the IBM 3090 or AS/400 (AS/400 is trademark to International Business Machines Corporation) with attached personal computer workstations. Buyers 406 and Requestors 408 all interface to the system via workstations. The Electronic Requisition 410, which is the output of the electronic catalog ordering system is ted into Customer's existing procurement system 412. Procurement systems and methods are well-known in the art and are beyond the scope of this invention.

Communications between the computer systems are best accomplished using industry standards such as American National Standard Institute (ANSI) X24. Details of this standard can be obtained directly from ANSI.

While the invention has been particularly shown and described with reference to a preferred embodiment thereof, it will understood by those skilled in the art that various changes in detail may be made therein without departing from the spirit, scope and teaching of the invention. Accordingly, the system and method herein disclosed is to be considered merely as illustrative, and the invention is to be limited only as specified in the claims.

We claim:

1. A system for electronically ordering items comprising:
   at least one supplier computer system, having means for creating and storing at least one catalog containing items offered by the supplier and means for accepting orders for items;
   a public computer system containing a complication of catalogs of items offered by the supplier;
   means connecting said supplier computer systems and said public computer system for transferring catalog data to said public computer system to create a public catalog;
   a first Customer/Requestor computer system containing a first private catalog and having means for accessing said catalogs on said public computer system, means for electronically ordering items directly from the suppler, and means for modifying said first private catalog; and
   a second Customer/Requestor computer system containing a second private catalog and having means for accessing said catalogs on said public computer system, means or electronically ordering items directly from the supplier, and means for modifying said second private catalog so that said second private catalog is different form said first private catalog.

2. The system as claimed in claim 1 wherein said Customer/Requestor computer system further includes means for creating and routing an electronic requisition.

3. The system as claimed in claim 1 wherein said public computer system contains catalogs of items offered by a plurality of suppliers.

4. The system as claimed in claim 3 wherein said public computer system includes means or comparing items for the plurality of suppliers.

5. The system as claimed in claim 1 wherein said means for creating and storing at least one catalog include means for creating a public catalog and means for creating a private catalog.

6. The system as claimed in claim 1 wherein said means for electronically ordering items includes a procurement system connected to the supplier computer system's means for accepting orders.

7. The system as claimed in claim 1 wherein said supplier computer system further includes means for maintaining the public and private catalogs.

8. In an electronic catalog requisition system in which catalogs of items offered by suppliers are stored on a central catalog database system, a method for retrieving information elating to said items and electronically ordering items from suppliers comprising the following steps:
   searching the catalog database for information on a customer-selected item, said catalog database residing on a public computer system;
   downloading said information on said customer-selected item to a Customer/Requestor computer system;
   creating an electronic requisition using the Customer/Requestor computer system; and
   transmitting the electronic requisition to a supplier computer system.

9. The method as claimed in claim 8 wherein at least one of the catalogs is stored on the Customer/Requestor computer system and the step of searching the catalog database includes the step of searching the requestor computer system.

10. The method as claimed in claim 8 further includes the step of routing the electronic requisition to approvers.

11. A method for facilitating the ordering of items offered by a supplier comprising the following steps:
    creating a machine readable catalog of information relating to items offered by a vendor at a suppler computer system;
    transmitting the machine readable catalog to a public database system for access by Customer/Requestors;
    transmitted the machine readable catalog to a customer/requestor system;
    and receiving electronic purchase requisitions from said Customer/Requestor system based upon information obtained from said machine readable catalog.

12. The method as claimed in claim 11 further including the step of maintaining the machine readable catalogs.

13. In an electronic catalog requisition system in which catalogs of items offered by suppliers are stored on a central catalog database system, a method for retrieving information relating to said items and electronically ordering items from suppliers comprising the following steps:
    downloading the catalog database to a Customer/Requestor computer system;
    modifying said catalog database to create a private catalog, said private catalog containing data different than said downloaded catalog database;
    searching said private catalog for information on an item selected by a user;
    creating an electronic requisition for said item using the customer/Requestor computer system; and
    transmitting said electronic requisition to a supplier computer system.

14. A method as claimed in claim 13 further including the step of transmuting said electronic requisition to a Customer/Requestor approver prior to transmitting said requisition to said supplier computer system.

* * * * *

UNITED STATES PATENT AND TRADEMARK OFFICE
CERTIFICATE OF CORRECTION

PATENT NO. : 5,319,542
DATED : June 7, 1994
INVENTOR(S) : John E. King Jr. et al It is certified that error appears in the above-indentified patent and that said Letters Patent is hereby corrected as shown below:

Column 2, line 57, change "Feaster" to --Master--.
Column 6, line 65, following "it will", add --be--.
Column 7, claim 1, line 29, change "form" to --from--.
Column 8, claim 8, line 7, change "Customer/-" to --Customer/--.
Column 8, claim 11, line 26, change "transmitted" to --transmitting--.
Column 8, claim 13, line 40, change "Customer/-" to --Customer/--.
Column 8, claim 13, line 48, change "customer/Requestor" to --Customer/Requestor--.

Signed and Sealed this

Twenty-fifth Day of October, 1994

Attest:

BRUCE LEHMAN

Attesting Officer

Commissioner of Patents and Trademarks

UNITED STATES PATENT AND TRADEMARK OFFICE
CERTIFICATE OF CORRECTION

| | | |
|---|---|---|
| PATENT NO. | : 5,319,542 | Page 1 of 1 |
| APPLICATION NO. | : 07/589353 | |
| DATED | : June 7, 1994 | |
| INVENTOR(S) | : John E. King, Jr. and John R. Nilsen | |

It is certified that error appears in the above-identified patent and that said Letters Patent is hereby corrected as shown below:

Column 7, claim 1, line 11, "complication" should be --compilation--.

Column 7, claim 1, line 21, "suppler" should be --supplier--.

Column 7, claim 1, line 26, "means or" should be --means for--.

Column 7, claim 4, line 37, "means or" should be --means for--.

Column 7, claim 8, line 53, "elating" should be --relating--.

Column 8, claim 11, line 22, "suppler" should be --supplier--.

Column 8, claim 14, line 52, "transmuting" to --transmitting--.

Signed and Sealed this

Twelfth Day of December, 2006

JON W. DUDAS
*Director of the United States Patent and Trademark Office*